Feb. 16, 1932.  M. E. MAHER  1,845,672
ADJUSTABLE COUPLING MEANS
Filed May 23, 1930
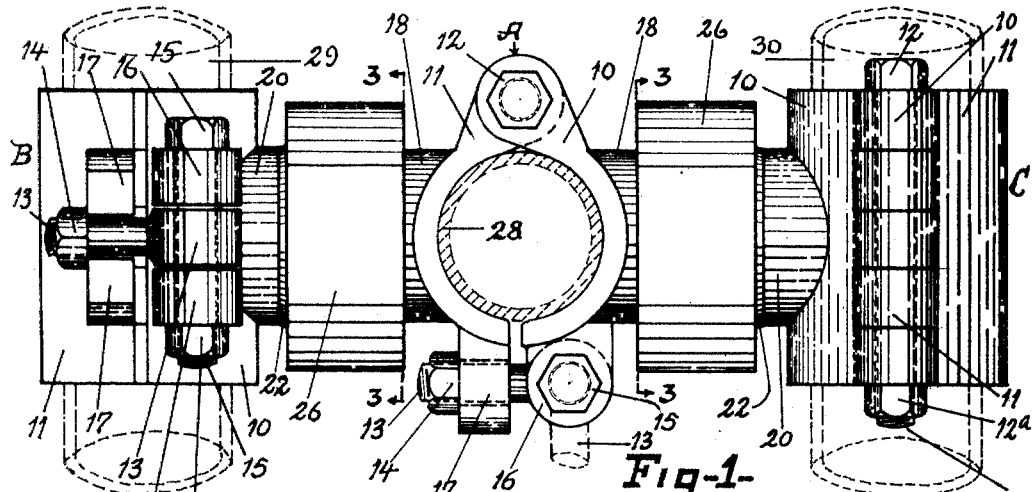
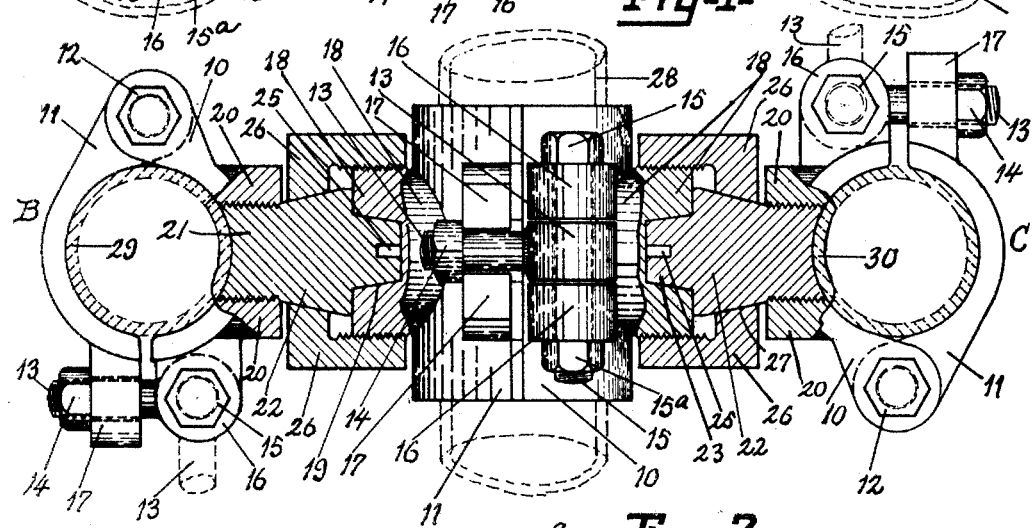
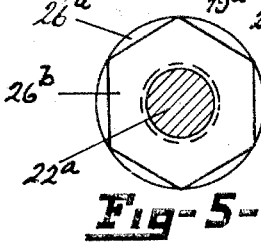
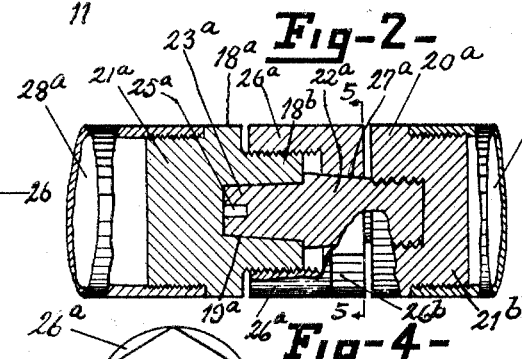
INVENTOR.
MARTIN E MAHER
BY
ATTORNEYS.

Patented Feb. 16, 1932

1,845,672

UNITED STATES PATENT OFFICE

MARTIN E. MAHER, OF CLIFTON, NEW JERSEY

ADJUSTABLE COUPLING MEANS

Application filed May 23, 1930. Serial No. 454,881.

The invention relates to coupling means designed more particularly for use in connection with scaffolds and similar supporting structures of a framework type. Such scaffolding or equivalent structures usually consist of sections generally in the form of tubes adapted to be detachably connected with each other in axial alignment and in various intersecting relations to constitute the complete structure.

The object of the invention is to provide a simple and effective coupling means whereby the tubular sections may be connected in end to end relation, and coupled together in such intersecting relation as may be necessary, in an efficient manner, without requiring any particular skill in the erection or dismantling of the scaffold or equivalent framework. Other more specific objects will appear from the description hereinafter, and the features of novelty will be pointed out in the claims.

In the accompanying drawings, which show examples of the invention without defining its limits, Figs. 1 and 2 are views looking at right angles to each other and showing the coupling means in three-way form; Fig. 3 is a sectional view on either one of the lines 3—3 of Fig. 1; Fig. 4 is a fragmentary sectional view showing the coupling means in a form adapted for connecting the scaffolds or their equivalent in axial alignment, and Fig. 5 is a section thereof on the line 5—5 of Fig. 4.

In the form shown in Figs. 1, 2 and 3, the coupling means comprises a plurality of clamping devices, one of which may be termed the main clamping device A, and the others of which may be designated as auxiliary clamping devices B and C, respectively.

In the illustrated example, each of the clamping devices comprises clamping jaws 10 and 11 pivotally connected with each other by means of a bolt 12 and nut 12ª and provided with means whereby the clamping jaws 10 and 11 may be caused to develop the desired clamping action. As shown in the drawings, this means consists of a bolt 13 threaded to receive a nut 14 and pivotally connected by means of a bolt 15 and nut 15a with lugs 16 carried by the clamping jaw 10. The bolt 13 is arranged to co-operate with a recessed lug 17 projecting from the other clamping jaw 11, as shown in Figs. 1 and 2. The detail construction and form of the clamping devices is no particular part of the invention and may be changed to meet the requirements of the particular coupling means for which said clamping devices are designed.

As shown in Figs. 1 and 2, the clamping devices are provided with members which project radially outward therefrom for abutting engagement with each other in co-operating pairs; one of the members of each pair is provided with a preferably tapering recess adapted to receive a correspondingly formed plug which projects from the other member of each pair and with its co-operating recess constitutes a pivot on which the clamping devices may be pivotally adjusted relatively to each other. In the illustrated form the members referred to comprise externally screwthreaded bosses 18 projecting radially outward from the main clamping device A, for instance, in opposite directions and provided with the preferably tapering recesses 19 referred to above. The co-operating members consist of internally screwthreaded bosses 20 projecting radially outward from the auxiliary clamping devices B and C and adapted to receive the threaded attaching devices 21 which are continued in the form of outwardly diverging extensions 22 which provide outwardly diverging bearing surfaces, the purpose of which will appear more fully hereinafter. The previously mentioned, preferably tapering plugs 23 project from the extensions 22 and fit into the recesses 19 as clearly shown in Fig. 2. To facilitate the connection of the attaching devices 21 with the bosses 20, the plugs 23 may be provided with sockets 25 for the accommodation of a screwdriver or similar tool. In the assembled condition of the parts, as shown in Figs. 1 and 2, the bosses 18 and the extensions 22 are in abutting engagement with each other in axial alignment. The coupling means further includes means whereby the extensions 22 are drawn into engagement with the bosses 18 to fix the clamping devices A, B and C against relative movement. In the illustration this means consists of a collar 26 bevelled at 27 to slidably and rotatably fit the outwardly diverging surface of the co-operating extension 22 and internally screwthreaded for connection with the externally screwthreaded member or boss 18.

In practice the main clamp A may be securely clamped for instance upon an upright tubular supporting member 28 comprising part of the scaffold or its equivalent, and the auxiliary clamping devices B and C similarly secured upon corresponding tubular supports 29 and 30, respectively.

In order to position the supporting member 28 and the tubular supports 29 and 30 in any desired relation to each other, either parallel or at any relative angles of inclination, it is simply necessary to unscrew the collars 26 upon the members or bosses 18 to an extent sufficient to remove the pressure at the bevels 27 from the outwardly diverging surfaces of the extensions 22 and to thereby relieve the abutting pressure of said extensions against said members or bosses 18. The clamping devices A, B and C and with them the supporting member 28 and tubular supports 29 and 30 or either of them, may be pivotally adjusted in the respective planes of the supporting member 28, and the supports 29 and 30 to bring said supporting member 28 and supports 29 and 30 into any desired relative positions. When the adjustment necessary to the particular problem at hand has been secured, the collars 26 are simply again screwed upon the bosses or members 18 to cause the bevels 27 to exert a camming action upon the outwardly diverging surfaces of the extensions 22 and to thereby firmly clamp the extensions 22 in surface engagement with the bosses or members 18. During the pivotal adjustments of the clamping devices and the member 28 and supports 29 and 30, the plugs 23 in co-operation with the recesses 19 act as bearing pivots upon which such adjustments may take place, the contacting surfaces of the extensions 22 and bosses 18 meanwhile also serving as bearings to facilitate said adjustments.

It will be obvious that the clamping means may include but two of the clamping devices A and B or A and C and their associated elements to provide a two-way coupling means whenever and wherever such a modification of the device is required; similarly, the location of the recesses 19 and the plugs 23 may be reversed with respect to the members on which they are located in the illustrated example, without changing the efficiency of the device. The attaching devices 21 with their extensions 22 and plugs 23 are made detachable from the bosses 20 to facilitate the assembling of the collars 26 upon said extensions 22.

In Figs. 4 and 5 the coupling means is shown in the form adapted for connecting two sections of tubing together in end to end or aligning arrangement to form the tubular supporting members 28 or the tubular supports 29 and 30 for the purpose of increasing the length thereof in the erection of the scaffold or its equivalent. In this form the tube sections 28a are screwthreaded to receive attaching devices 21a and 21b corresponding to the attaching devices 21 of the previous figures. The attaching devices 21a and 21b comprise parts of members 18a and 20a, respectively, the member 18a being provided with an externally screwthreaded boss 18b and with a preferably tapering recess 19a corresponding to the recess 19 of Figs. 1 and 2. The member 20a in turn is provided with an outwardly diverging extension 22a, which provides an outwardly converging bearing surface for the bevel 27a of the collar 26a; the latter preferably includes a hexagonal section 26b constituting a nut to facilitate the operation of the collar 26a. A plug 23a projects from the extension 22a and is preferably tapered and dimensioned to fit the recess 19a; the plug 23a may be provided with a socket 25a for the accommodation of a screwdriver or other tool to facilitate the connection of the attaching device 21b with the tube 28a.

It will be obvious that as the collar 26a is screwed upon the boss 18b, the bevel 27a of said collar will exert a camming action upon the outwardly diverging surface of the extension 22a to force the end of the latter into abutting engagement with the end face of the boss 18b and to wedge the plug 23a in the recess 19a whereby the two tube sections 28a are securely united in axial alignment with each other. The two tube sections 28a may readily be disconnected by simply unscrewing the collar 26a from the boss 18b as will be apparent from an inspection of Fig. 4. The arrangement and dimensions of the parts is such that when connected with the tubes 28a the coupling will lie flush with the outer surface of said tubes; as a result the coupling shown in Fig. 4 will not interfere with the use of the coupling of Figs. 1 and 2 even if the latter should happen to register with the joint of the two tubes 28a in the erection of the scaffold.

With the novel coupling means as illustrated and described the scaffold or equivalent framework may be easily and quickly erected in many different arrangements, and the sections of the supporting members or tubular supports may be readily combined to provide the necessary length in such supports, without requiring any particular skill on the part of the erectors; the scaffolding or equivalent framework may likewise be easily dismantled with a minimum of time and effort. At the same time the novel coupling means provides a very efficient scaffold construction or equivalent framework in which the factors of rigidity and safety are developed to a maximum degree. The coupling means may at the same time be readily assembled to constitute two or three-way couplings and may be constructed to provide still different arrangements, without departing from the spirit of the invention or affecting the efficiency thereof. All of the units of the coupling means are combined in a manner to prevent loss or misplacement thereof, and are capable of being produced at relatively low cost. While the coupling means is designed primarily for use in the erection of scaffolds it obviously is capable of being used with efficiency in the erection of other types of framework which are intended to be either temporary or more or less permanent.

Various changes in the specific forms shown and described may be made within the scope of the claims without departing from the spirit of the invention.

I claim:

1. A coupling means of the kind described comprising a pair of attaching devices adapted to be attached to the elements to be coupled, an externally screwthreaded member projecting from one of said attaching devices and provided with a tapering recess, a co-operating member projecting from the other attaching device into abutting engagement with said externally threaded member and provided with an annular outwardly diverging bearing surface, a tapering plug projecting from said co-operating member and fitting said tapering recess, and an internally screwthreaded collar rotatably and slidably fitted upon said outwardly diverging surface of said co-operating member and arranged for threaded engagement with said externally threaded member to draw said members together and fix said devices against relative movement.

2. A coupling means of the kind described comprising a pair of attaching devices adapted to be attached to the elements to be coupled, an externally screwthreaded member projecting from one of said attaching devices and provided with a tapering recess, a co-operating member projecting from the other attaching device into abutting engagement with said externally threaded member, a tapering plug projecting from said co-operating member and fitting said tapering recess, an internally screwthreaded collar rotatably mounted on said co-operating member, and arranged for threaded engagement with said externally threaded member, and means on said co-operating member co-operating with said collar to draw said members together and fix said devices against relative movement as said collar is screwed upon said externally threaded member.

3. A coupling means of the kind described comprising a pair of attaching devices adapted to be attached to the elements to be coupled, members projecting from said devices and arranged for abutting engagement in axial alignment, one of said members including an outwardly diverging portion, and one of said members being provided with a recess, a plug projecting from the other member and fitting said recess, and means co-operating with said outwardly diverging portion of said one member and engaging the other member to draw said members together and to fix said devices against relative movement.

4. A coupling means of the kind described comprising a main clamping device and an auxiliary clamping device each adapted for clamping engagement with one of the elements to be coupled, an externally screwthreaded member projecting radially from said main clamping device and provided with a tapering recess, a co-operating member projecting radially from the auxiliary clamping device for abutting engagement with said externally threaded member and provided with an outwardly diverging surface, a tapering plug projecting from said co-operating member and fitting said tapering recess to constitute therewith a pivot on which said clamping devices may be pivotally adjusted relatively to each other in parallel planes, and an internally screwthreaded collar rotatably and slidably fitted upon said outwardly diverging surface and arranged for threaded engagement with said externally threaded member to draw said members together and fix said clamping devices against relative movement.

5. A coupling means of the kind described comprising a main clamping device and an auxiliary clamping device each adapted for clamping engagement with one of the elements to be coupled, an externally screwthreaded member projecting radially from said main clamping device and provided with a tapering recess, a co-operating member projecting radially from the auxiliary clamping device for abutting engagement with said externally threaded member, a tapering plug projecting from said co-operating member and fitting said tapering recess to constitute therewith a pivot on which said clamping devices may be pivotally adjusted relatively to each other, an internally screwthreaded collar rotatably mounted on said co-operating member for threaded engagement with said externally threaded member, and means on said co-operating member co-operating with said collar to draw said members together and fix said clamping devices against relative movement when said collar is screwed upon said externally threaded member.

6. A coupling means of the kind described comprising a main clamping device, a pair of auxiliary clamping devices, said devices each being adapted for clamping engagement with one of the elements to be coupled, externally threaded members projecting radially outward from said main clamping device in opposite directions, each of said members being provided with a recess, co-operating members projecting radially outward from said auxiliary clamping devices for abutting engagement with said externally threaded members, plugs projecting from said co-operating members and fitting said recesses to constitute therewith pivots on which said clamping devices may be pivotally adjusted relatively to each other in parallel planes, and means whereby said members are drawn together to fix said clamping devices against relative movement.

7. A coupling means of the kind described comprising a main clamping device, a plurality of auxiliary clamping devices, members projecting radially outward from said main clamping device and said auxiliary clamping devices in different directions for abutting engagement with each other in co-operating pairs, one member of each pair being provided with a recess, a plug on the other member of each pair fitting the recess of the co-operating member of each pair to constitute therewith independent pivots on which said auxiliary clamping devices may be pivotally adjusted relatively to said main clamping device, and means for independently drawing the members of each pair together to fix said auxiliary clamping devices against relative movement.

In testimony whereof I have hereunto set my hand.

MARTIN E. MAHER.